United States Patent
Lavertu et al.

(10) Patent No.: US 9,593,623 B2
(45) Date of Patent: Mar. 14, 2017

(54) SYSTEM AND METHOD FOR CONTROLLING OPERATION OF AN ENGINE

(71) Applicant: General Electric Company, Schenectady, NY (US)

(72) Inventors: Thomas Michael Lavertu, Clifton Park, NY (US); Anthony Holmes Furman, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 174 days.

(21) Appl. No.: 14/477,189

(22) Filed: Sep. 4, 2014

(65) Prior Publication Data

US 2016/0069252 A1 Mar. 10, 2016

(51) Int. Cl.
*F02B 37/10* (2006.01)
*F02B 37/00* (2006.01)
(Continued)

(52) U.S. Cl.
CPC ............ *F02B 37/10* (2013.01); *F02B 37/005* (2013.01); *F02B 39/10* (2013.01); *F02B 41/10* (2013.01); *F02D 19/081* (2013.01); *F02D 35/023* (2013.01); *F02D 41/0007* (2013.01); *F02D 41/0025* (2013.01); *F02B 29/0406* (2013.01);
(Continued)

(58) Field of Classification Search
CPC ... Y02T 10/144; Y02T 10/36; F02D 41/0025; F02D 19/081; F02D 41/0027; F02D 19/0647; F02D 19/0689; F02D 19/0692; F02D 19/084; F02D 19/0665; F02D 19/0671; F02D 19/061;
(Continued)

(56) References Cited

U.S. PATENT DOCUMENTS 4,745,754 A 5/1988 Kawamura
5,142,868 A 9/1992 Woon et al.
(Continued)

OTHER PUBLICATIONS

Thompson et al., "The technical merits of turbogenerating shown through the design, validation and implementation of a one-dimensional engine model", International journal of engine research, SAGE journals ,2012, 12 Pages.

*Primary Examiner* — Sizo Vilakazi
(74) *Attorney, Agent, or Firm* — Robert M. McCarthy

(57) ABSTRACT

The method involves receiving a plurality of current operating parameters of an engine during operation of engine and determining at least one of a current substitution ratio and a current peak cylinder pressure based on the plurality of current operating parameters. The method also involves determining at least one of a target substitution ratio and a predefined peak cylinder pressure based on the plurality of current operating parameters and comparing at least one of the current substitution ratio with the target substitution ratio and the current peak cylinder pressure with the predefined peak cylinder pressure. The method also involves controlling a first power output from a plurality of engine cylinders and a second power output from an electric turbo-compounding system, based on the comparison of at least one of the current substitution ratio with the target substitution ratio and the current peak cylinder pressure with the predefined peak cylinder pressure.

24 Claims, 3 Drawing Sheets

(51) Int. Cl.

| | | |
|---|---|---|
| *F02D 19/08* | (2006.01) | |
| *F02D 35/02* | (2006.01) | |
| *F02D 41/00* | (2006.01) | |
| *F02B 41/10* | (2006.01) | |
| *F02D 19/06* | (2006.01) | |
| *F02B 39/10* | (2006.01) | |
| *F02B 29/04* | (2006.01) | |

(52) U.S. Cl.
CPC ......... *F02D 19/0647* (2013.01); *Y02T 10/144* (2013.01); *Y02T 10/163* (2013.01); *Y02T 10/36* (2013.01)

(58) Field of Classification Search
CPC ............. F02D 19/0628; F02D 19/0655; F02D 19/0694; F02D 19/08; F02D 19/0644
See application file for complete search history.

(56) References Cited

U.S. PATENT DOCUMENTS

| | | | |
|---|---|---|---|
| 7,047,743 B1 | 5/2006 | Stahlhut et al. | |
| 7,076,954 B1* | 7/2006 | Sopko, Jr. ................ | B60K 6/46 |
| | | | 290/52 |
| 7,174,714 B2 | 2/2007 | Algrain | |
| 7,383,684 B2 | 6/2008 | Vuk | |
| 7,893,554 B2 | 2/2011 | Stahlhut et al. | |
| 7,958,727 B2 | 6/2011 | Arnold | |
| 8,302,398 B2 | 11/2012 | Vuk | |
| 2006/0218920 A1* | 10/2006 | Gokhale ............... | F02D 35/023 |
| | | | 60/601 |
| 2008/0121218 A1 | 5/2008 | Algrain | |
| 2012/0227397 A1 | 9/2012 | Willi et al. | |
| 2013/0055711 A1* | 3/2013 | Hofer ................... | F02B 37/013 |
| | | | 60/602 |

* cited by examiner

SYSTEM AND METHOD FOR CONTROLLING OPERATION OF AN ENGINE

BACKGROUND

The invention relates generally to engines, and more particularly, to a system and method for controlling peak cylinder pressure and/or substitution ratio of an engine, for example, a dual fuel engine.

In a compression-ignition engine, such as a diesel engine, a fuel injection system injects fuel (e.g. diesel fuel) into compressed air within each of the engine cylinders to create an air-fuel mixture that ignites due to the heat and pressure of compression. Unfortunately, engine efficiency, power output, fuel consumption, exhaust emissions, and other operational characteristics are less than ideal. In addition, conventional techniques to improve one operational characteristic often worsen one or more other operational characteristic. For example, attempts to decrease specific fuel consumption often cause increase in various exhaust emissions. Vehicle exhaust emissions include pollutants such as carbon monoxide, nitrogen oxides (NOx), particulate matter (PM), and unburned hydrocarbons (UHC) generated due to imperfect combustion of fuel within the combustion chamber. The amount of these pollutants varies depending on the fuel-air mixture, compression ratio, injection timing, ambient conditions, and so forth.

In the oil and gas market and transportation sector, for example, the fuel bill is a significant contributor to the total cost of operation. The rapid expansion and abundance of natural gas in some areas of the world is driving a dramatic cost advantage of natural gas over diesel fuel, making natural gas an attractive fuel source. A dual fuel engine is based on a traditional diesel engine, with the addition of dual fuel specific hardware. When the engine is operating in dual fuel mode, natural gas is introduced into an intake system. Near the end of the compression stroke, diesel fuel is then injected. The diesel fuel ignites and the diesel combustion causes the natural gas to burn.

At higher brake mean effective pressure levels, when the substitution ratio of natural gas to diesel is increased, the engine is more susceptible to knock. Further, when the substitution ratio is increased, the allowable range of air to fuel ratio (AFR) between knock and misfire is reduced. When a fixed geometry turbocharger is used, it is difficult to control the airflow in an efficient manner to the engine.

There is a need for an enhanced system and method for controlling the operation of an engine.

BRIEF DESCRIPTION

In accordance with one exemplary embodiment, a method is disclosed. The method involves receiving a plurality of current operating parameters of an engine during operation of the engine and determining at least one of a current substitution ratio and a current peak cylinder pressure based on the plurality of current operating parameters. The method also involves determining at least one of a target substitution ratio and a predefined peak cylinder pressure based on the plurality of current operating parameters and comparing at least one of the current substitution ratio with the target substitution ratio and the current peak cylinder pressure with the predefined peak cylinder pressure. The method further involves controlling a first power output from a plurality of cylinders of the engine and a second power output from an electric turbo-compounding system coupled to the engine, based on the comparison of at least one of the current substitution ratio with the target substitution ratio and the current peak cylinder pressure with the predefined peak cylinder pressure.

In accordance with another exemplary embodiment, a computer readable medium, having instructions stored thereon which, when executed, causes a processor-based unit for an engine to perform a method is disclosed. The method involves receiving a plurality of current operating parameters of an engine during operation of the engine and determining at least one of a current substitution ratio and a current peak cylinder pressure based on the plurality of current operating parameters. The method also involves determining at least one of a target substitution ratio and a predefined peak cylinder pressure based on the plurality of current operating parameters and comparing at least one of the current substitution ratio with the target substitution ratio and the current peak cylinder pressure with the predefined peak cylinder pressure. The method further involves controlling a first power output from a plurality of cylinders of the engine and a second power output from an electric turbo-compounding system coupled to the engine, based on the comparison of at least one of the current substitution ratio with the target substitution ratio and the current peak cylinder pressure with the predefined peak cylinder pressure.

In accordance with yet another embodiment, a system is disclosed. The system includes an engine having a plurality of cylinders and a plurality of fuel injectors coupled to the plurality of cylinders. An electric turbo-compounding system is coupled to the engine. A controller is coupled to the engine and the electric turbo-compounding system. The controller is configured to receive a plurality of current operating parameters of an engine during operation of the engine and determine at least one of a current substitution ratio and a current peak cylinder pressure based on the plurality of current operating parameters. The controller is further configured to determine at least one of a target substitution ratio and a predefined peak cylinder pressure based on the plurality of current operating parameters and comparing at least one of the current substitution ratio with the target substitution ratio and the current peak cylinder pressure with the predefined peak cylinder pressure. The controller is further configured to control a first power output from a plurality of cylinders of the engine and a second power output from an electric turbo-compounding system coupled to the engine, based on the comparison of at least one of the current substitution ratio with the target substitution ratio and the current peak cylinder pressure with the predefined peak cylinder pressure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
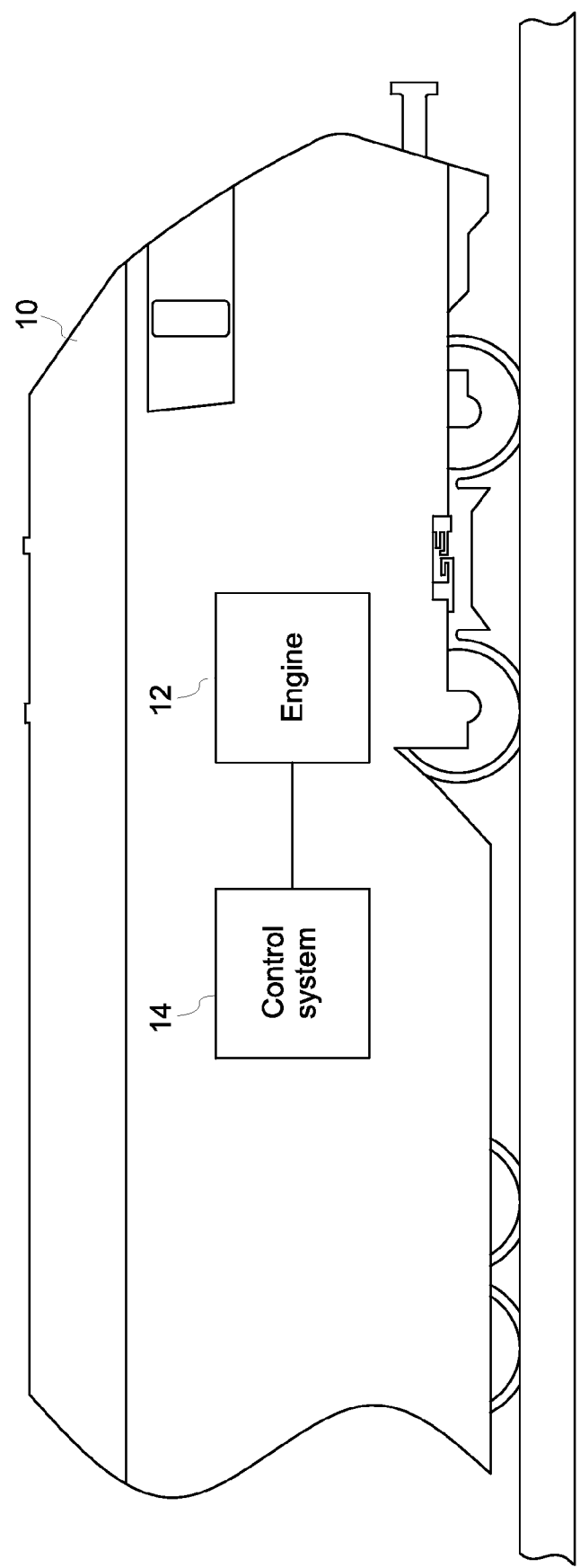
FIG. 1 is a schematic diagrammatical representation of a vehicle moving from a first operating point to a second operating point along a predefined path in accordance with an exemplary embodiment.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the internet, as well as yet to be developed digital means, with the sole exception being a transitory, propagating signal.

As used herein, the terms "software" and "firmware" are interchangeable, and may include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

In accordance with certain embodiments of the present invention, a method for operating an engine is disclosed. The method involves receiving a plurality of current operating parameters of an engine during operation of the engine. The method also involves determining at least one of a current substitution ratio and a current peak cylinder pressure based on the plurality of current operating parameters. A substitution ratio is defined as the fraction of the total fuel energy that is provided by the gaseous fuel, for example, natural gas. The method further involves determining at least one of a target substitution ratio and a predefined peak cylinder pressure based on the plurality of current operating parameters. The current substitution ratio is compared with the target substitution ratio and/or the current peak cylinder pressure is compared with the predefined allowable peak cylinder pressure. The method further involves controlling a first power output from a plurality of cylinders of the engine and a second power output and a corresponding boost pressure level from an electric turbo-compounding system coupled to the engine, based on the comparison of at least one of the current substitution ratio with the target substitution ratio and the current peak cylinder pressure with the predefined peak cylinder pressure. In accordance with another embodiment, a computer readable medium, having instructions stored thereon which, when executed, causes a controller for an engine to perform an exemplary method, is disclosed. In accordance with yet another embodiment, a system having an engine, an electric turbo-compounding system, and a controller is disclosed.

In accordance with the embodiments of the present invention, the method involves using an electric turbo-compounding system to extract work and thereby allow the engine power assembly to operate at lower power levels by reducing the boost pressure from the turbocharger system. The use of the electric turbo-compounding system facilitates to reduce a peak cylinder pressure and to enable operation at an enhanced a substitution ratio, while recovering useful additional energy from a turbocharger shaft.

Referring to FIG. 1, a schematic diagrammatical representation of a vehicle 10 moving from a first operating point to a second operating point along a predefined path is shown. In the illustrated embodiment, the vehicle 10 is a locomotive. Suitable vehicles include passenger and non-passenger vehicles, hybrid vehicles, off-highway vehicles, on-road vehicles (such as tractor trailers), tracked vehicles, rail vehicles, and the like. The vehicle 10 includes an engine 12 and an exemplary control system 14 coupled to the engine 12.

In the illustrated embodiment, the vehicle 10 is driven by the engine 12 utilizing a plurality of fuels. In the exemplary engine 12, a reduction in nitrogen oxide ($NO_x$) and particulate matter (PM) emissions is enabled by combusting a relatively larger fraction of the premixed fuel. However, relative costs and availability of different fuels are constantly in flux. For example, in some embodiments, diesel and natural gas may be utilized to drive the engine 12. If the cost of diesel fuel increases relative to the cost of the natural gas, more natural gas may be used resulting in reduced operating cost and emissions. If the cost of natural gas is increased relative to the cost of the diesel, then more diesel may be used to drive the engine 12. It should be noted herein that in certain embodiments, the vehicle 10 may also utilize other fuels instead of diesel and natural gas.

The exemplary control system 14 is used to control operation of the engine 12 to reduce a peak cylinder pressure, brake mean effective pressure, and enhance a substitution ratio. Although a dual fuel engine is discussed herein, the exemplary control system and an associated method may also be applicable to other types of engine, for example, a spark ignited single fuel engine to control a peak cylinder pressure. In certain other embodiments, the engine 12 and the control system 14 may be used for stationary applications. The engine 12 and the control system 14 are explained in greater detail with reference to subsequent figures.

Figure 2:
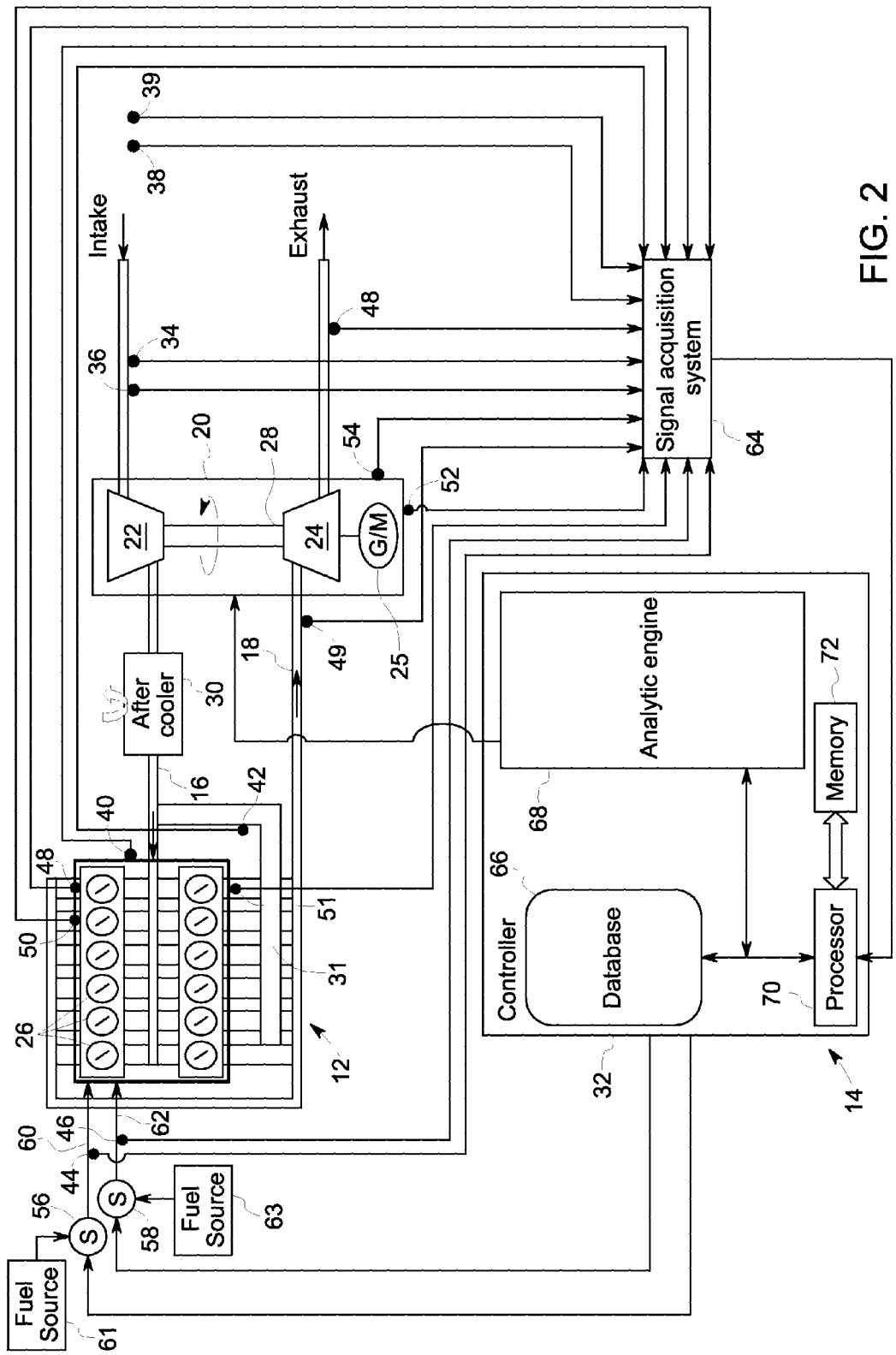
FIG. 2 is a schematic diagrammatical representation of an engine having peak cylinder pressure and/or substitution ratio control features in accordance with certain embodiments of the present invention.

Referring to FIG. 2, a schematic diagrammatical representation of the engine 12 having peak cylinder pressure and/or substitution ratio control features is illustrated in accordance with certain embodiments of the present invention. As discussed in further detail below, embodiments of the present invention provide monitoring and control features, such as sensors and control logic in which power output from the base engine and an electric turbo-compounding system are controlled so as to control a peak cylinder pressure and/or a substitution ratio.

In the illustrated embodiment, the engine 12 is a dual fuel engine. The illustrated engine 12 includes an air intake manifold 16 and an exhaust manifold 18. The engine 12 is provided with an electric turbo-compounding system 20 having a compressor 22 and a turbine 24 coupled to a generator 25. The compressor 22 is operated to supply compressed air to the intake manifold 16 for combustion within a plurality of cylinders 26. The turbine 24 is coupled to the exhaust manifold 18, such that the exhaust gases expand through the turbine 24, putting work onto and rotating a turbocharger shaft 28 coupled to the compressor 22. The turbine 24 also drives the generator 25 for generating electric power. In some embodiments, the generator 25 functions as a motor to provide power to the shaft 28. The compressor 22 draws ambient air through a filter (not shown) and provides compressed air to a heat exchanger 30. The temperature of air is increased due to compression through the compressor 20. The compressed air flows through the heat exchanger 30 such that the temperature of air is reduced prior to delivery into the intake manifold 16 of the engine 12. In one embodiment, the heat exchanger 30 is an air-to-water heat exchanger, which utilizes a coolant to facilitate removal of heat from the compressed air. In another embodiment, the heat exchanger 30 is an air-to-air heat exchanger, which utilizes ambient air to facilitate removal of heat from the compressed air. In another embodiment, the heat exchanger 30 is a combination of an air-to-air heat exchanger and an air-to-water heat exchanger, which utilizes both ambient air and liquid to facilitate removal of heat from the compressed air. In the illustrated embodiment, exhaust gas from some of the cylinders among the plurality of cylinders 26 is recirculated to the intake manifold 16 via a recirculation pipe 31. In another embodiment, the engine 12 may not employ exhaust gas recirculation. Although a single stage electric turbo-compounding system is disclosed herein, in other embodiments, a two stage electric turbo-compounding system may be used. In such embodiments, the generator 25 may be provided to either a first stage or a second stage of the two stage electric turbo-compounding system.

The electric turbo-compounding system 20 is configured to control turbo speed to increase or reduce boost pressure by controlling the amount of power extracted from the generator 25. The turbo speed is reduced by increasing the generator load, so as to reduce boost pressure to the engine 12, and reduce peak cylinder pressure. It should be noted herein that the overall power from the entire system remains constant. If compressor work is reduced, electric output from the generator 25 is increased, so that the overall turbo power output remains constant. In some embodiments, the overall turbo power may vary by a quantity.

The control system 14 also includes a controller 32. In one embodiment, the controller 32 is an electronic logic controller that is programmable by a user. In the illustrated embodiment, the control system 14 further includes an intake manifold temperature sensor 34, an intake manifold pressure sensor 36, an ambient pressure sensor 38, an ambient temperature sensor 39, an air-fuel ratio sensor 40, a quantity of exhaust gas recirculation sensor 42, fuel injection timing sensors 44, 46, an engine speed sensor 48, an engine load sensor 50, a lambda sensor 49, an engine notch sensor 51, a generator current sensor 52, and a generator voltage sensor 54. The fuel injection timing sensors 44, 46 are configured to determine duration of injection and amount of fuel injection from the fuel injectors 56, 58. The fuel injectors 56, 58 are used to inject fuels 60, 62 (for example, diesel and natural gas) respectively fed from fuel sources 61, 63. Diesel, for example, is injected directly into the cylinders 26. Natural gas, for example, may be injected into the intake manifold 16 or directly into the cylinders 26. The lambda sensor 49 is configured to measure concentration of oxygen in the exhaust gas. In one embodiment, a first power output from the plurality of cylinders 26 of the engine 12 is determined based on a measured engine speed and estimated engine torque. The engine torque may be estimated based on the plurality of operating parameters of the engine. A second power output from the electric turbo-compounding system 20 is determined based on a measured generator current and generator voltage. In another embodiment, a first power output from the plurality of cylinders 26 of the engine 12 is determined based on a measured current and voltage of an alternator coupled to the engine 12. The controller 32 receives the corresponding output signals from the sensors 34, 36, 38, 39, 40, 42, 44, 46, 48, 49, 50, 51, 52, and 54. In other embodiments, other types of sensors for measuring different operating parameters associated with the engine 12 may be used. In other specific embodiments, the controller 14 may estimate the air-fuel ratio based on the measured different parameters associated with the engine 12.

A signal acquisition system 64 receives the plurality of signals from the plurality of sensors 34, 36, 38, 39, 40, 42, 44, 46, 48, 49, 50, 51, 52, and 54 and transmits the plurality of signals to the controller 32. In other words, the controller 32 receives the determined operating parameters from the sensors 34, 36, 38, 39, 40, 42, 44, 46, 48, 49, 50, 51, 52, and 54 via the signal acquisition system 64. The controller 32 includes a database 66, an analytic engine 68, a processor 70, and a memory 72.

The database 66 may be configured to store predefined information about the engine 12. For example, the database 48 may store information relating to an intake manifold temperature, an intake manifold pressure, an ambient pressure, an ambient temperature, an air-fuel ratio, a quantity of exhaust gas recirculation, a compression ratio, a fuel injection timing, concentration of oxygen in the exhaust gas, an engine speed, an engine load, generator current, generator voltage, alternator current, alternator voltage, the first power output from the plurality of cylinders 26, the second power output from the electric turbo-compounding system 20, peak cylinder pressure, brake mean effective pressure, and substitution ratio. Furthermore, the database 66 may be configured to store actual sensed/detected information from the above-mentioned sensors 34, 36, 38, 39, 40, 42, 44, 46, 48, 49, 50, 51, 52, and 54. The algorithm facilitates the processing of signals from the above-mentioned plurality of sensors 34, 36, 38, 39, 40, 42, 44, 46, 48, 49, 50, 51, 52, and 54.

In one embodiment, the database 66 may be stored in a single memory module at one location. In other embodiments, the database 66 may be stored in a plurality of memory modules in a distributed manner. The database 66 may be at least one of a SQL database, an Oracle database, and a MySQL database. In alternate embodiments, other types of databases including relationship database systems (RDBS) may be used to store the plurality of rules. It may be noted herein that in one embodiment, the database 66 is a customized database. In other embodiments, the database 66 may be an off-the-shelf database.

The analytic engine 68 is communicatively coupled to the database 66. The analytic engine 68 may be stored in the memory 72 and executable by the processor 70. In an alternate embodiment, the analytic engine 68 may also be a specialized hardware such as a Field Programmable Gate Array (FPGA). The analytic engine 68 includes codes and routines configured to control the fuel injectors 56, 58 and the electric turbo-compounding system 20 based on the comparison of at least one of a current substitution ratio with a target substitution ratio and a current peak cylinder pressure with a predefined peak cylinder pressure, so as to control a first power output from the plurality of cylinders 26 and a second power output from the electric turbo-compounding system 20.

In one embodiment, the analytic engine 68 includes a set of instructions executable by the processor 70. In another embodiment, the analytic engine 68 is stored in the memory 72 and is accessible and executable by the processor 70. In either embodiment, the analytic engine 68 is adapted for communication and co-operation with the processor 70 and other modules of the controller 32.

The processor 70 is communicatively coupled to the database 66 and the analytic engine 68. The processor 70 may include at least one arithmetic logic unit, microprocessor, general purpose controller or other processor arrays to perform the desired computations. In one embodiment, the processor 70 is a custom hardware configured to perform functions of the analytic engine 68 and the signal acquisition system 64. In another embodiment, the processor 70 is a digital signal processor or a microcontroller. The processor 70 may also be configured to manage the contents of the database 66. In some embodiments, other type of processors, operating systems, and physical configurations are envisioned.

The memory 72 is coupled to the processor 70 and may also be optionally coupled to the other modules of the controller 32. The memory 72 is configured to store instructions performed by the processor 70 and contents of the database 66. The memory 72 may be a non-transitory storage medium. For example, the memory 72 may be a dynamic random access memory (DRAM) device, a static random access memory (SRAM) device, flash memory, or other memory devices. In one embodiment, the memory 72 may include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, the memory 72 may be communicatively coupled to the processor 70. In an alternate embodiment, the memory 72 is an on-board memory of the processor 70.

In an exemplary embodiment, the non-transitory computer readable medium encoded with a program, instructs the processor 70 to perform functions associated with the controller 32 for controlling operation of the engine 12. The program instructions include one or more functions of the database 66, the analytic engine 68, and the signal acquisition system 64.

Figure 3:
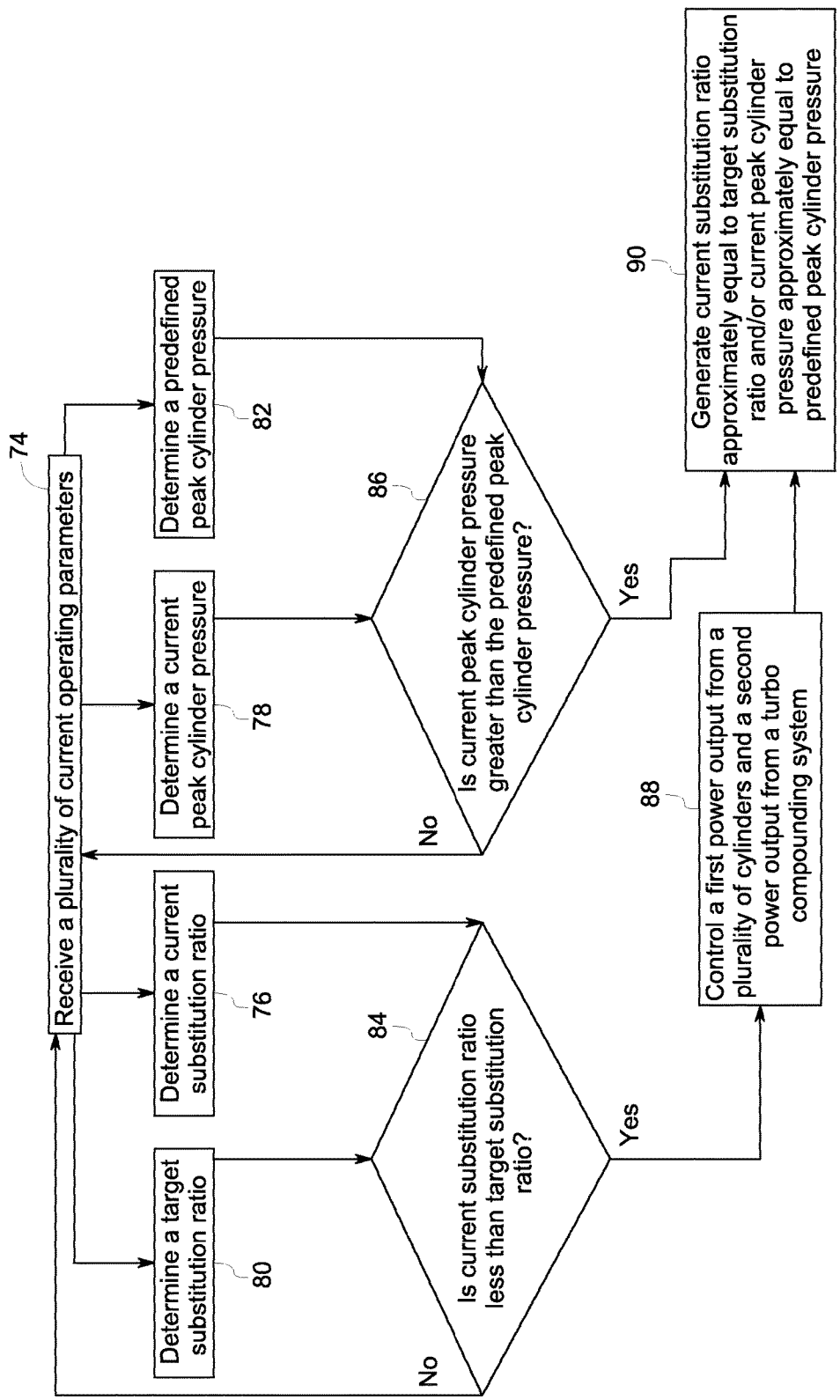
FIG. 3 is a flow chart illustrating the exemplary steps involved in controlling an engine in accordance with an exemplary embodiment.

Referring to FIG. 3, a flow chart illustrating the exemplary steps involved in controlling an engine in accordance with an exemplary embodiment, is disclosed. The method involves receiving a plurality of current operating parameters of an engine during operation of the engine 74. Specifically, a controller receives the plurality of current operating parameters. The plurality of current operating parameters include an intake manifold temperature, an intake manifold pressure, an ambient pressure, an ambient temperature, an air-fuel ratio, a quantity of exhaust gas recirculation, a compression ratio, a fuel injection timing, an engine speed, an engine load, concentration of oxygen in the exhaust gas, generator current, and a generator voltage. The current operating parameters may be obtained using sensors or estimated based on other parameters. It should be noted herein that the compression ratio of the engine is a design parameter (i.e. set at the design stage).

The method further involves determining at least one of a current substitution ratio 76 and a current peak cylinder pressure 78 based on the plurality of current operating parameters via the contoller. In one embodiment, the current substitution ratio is determined either from a look-up table (obtained from test data) or using a transfer function, based on a temperature before the start of combustion (i.e., pre-combustion temperature), the engine speed, and the engine load. The pre-combustion temperature is determined based on an intake oxygen concentration, the intake manifold temperature, the compression ratio, and the intake manifold pressure. In one specific embodiment, the pre-combustion temperature ($T_2$) is obtained from the following relation:

$$\frac{T_2}{T_1} = CR^{\gamma-1} \qquad (1)$$

$T_1$ is the temperature at the start of compression, CR is the compression ratio, $\gamma$ is the ratio of specific heats in the intake flow to the engine. $T_1$ is estimated from a look-up table based on the intake manifold temperature. The intake oxygen concentration is estimated based on the air-fuel ratio, the concentration of oxygen in the exhaust gas, the engine speed, or the like. In another embodiment, the current substitution ratio is determined based on fuel injection timing. An amount of each injected fuel is determined based on the fuel injection timing.

In one embodiment, the current peak cylinder pressure is determined either from a lookup table (available test data) or a using a transfer function, based on the intake manifold pressure, the fuel injection timing, the intake manifold temperature, the engine speed, and the engine load. Alternatively, a pressure sensor may be used to directly measure the current peak cylinder pressure. In one specific embodiment, the current peak cylinder pressure is determined based on the following relation:

$$\frac{P_2}{P_1} = CR^{\gamma} \qquad (2)$$

where ($P_2/P_1$) is the pressure ratio from compression, $P_1$ is the pressure at start of compression, $P_2$ is the pressure at the end of compression in the engine cylinder, CR is the compression ratio, $\gamma$ is the ratio of specific heats in the intake flow to the engine. The current peak cylinder pressure is obtained by multiplying the value of (P2/P1) with the value of $P_1$.

The method further involves determining at least one of a target substitution ratio 80 and a predefined peak cylinder pressure 82 based on the plurality of current operating parameters via the controller. In one embodiment, at least one of the target substitution ratio and the predefined peak cylinder pressure are estimated from a look-up table based on the detected engine notch and ambient conditions. The method further involves comparing at least one of the current substitution ratio with the target substitution ratio 84 and the current peak cylinder pressure with the predefined peak cylinder pressure 86 via the controller. In one embodiment, the comparing involves checking if at least one of the current substitution ratio is less than the target substitution ratio and if the current peak cylinder pressure is greater than the predefined peak cylinder pressure.

The method further involves controlling a first power output from a plurality of cylinders of the engine and a second power output from an electric turbo-compounding system coupled to the engine, via the controller, based on the comparison of at least one of the current substitution ratio with the target substitution ratio and the current peak cylinder pressure with the predefined peak cylinder pressure 88. In one specific embodiment, the controlling involves reducing a first power output from the plurality of cylinders to less than or equal to a first predefined power output and increasing the second power output from the electric turbo-compounding system to greater than or equal to a second predefined power output if at least one of the current substitution ratio is less than the target substitution ratio and the current peak cylinder pressure is greater than the predefined peak cylinder pressure. Specifically, the controller controls a plurality of fuel injectors for controlling an amount of fuel/fuels injected to the plurality of cylinders. The fuel injection timing (duration of the fuel injection event) is controlled to regulate the amount of fuel injected to the plurality of cylinders. Specifically, the amount of fuel injected to the cylinders is reduced to reduce the first power output from the plurality of cylinders to less than or equal to a first predefined power output. Further, the controller reduces the speed of the turbo-compounding system to a predefined speed by increasing the generator load, thereby reducing boost pressure level so as to increase the second power output from the electric turbo-compounding system to greater than or equal to a second predefined power output. The load on the generator is increased to extract additional energy from the turbocharger shaft. The additional energy may be transmitted to the engine system for tractive effort, stored in a battery system, or used to offset auxiliary power loads such as cooling fans or the like. The first power output and the second power output are controlled so as to maintain a constant overall power output. In another embodiment, the generator of the electric turbo-compounding system is operated as a motor to increase a speed of electric turbo-compounding system and a boost pressure from the electric turbo-compounding system. In yet another embodiment, the first power output and the second power output are controlled so as to increase the overall power output.

The control of the first power output and the second power output results in at least one of increase in the current substitution ratio to approximately equal to the target substitution ratio if the current substitution ratio is less than the target substitution ratio and reduction in the current peak cylinder pressure to approximately equal to the predefined peak cylinder pressure if the current peak cylinder pressure is greater than the predefined peak cylinder pressure 90. The control of the first power output to a lower power by controlling fuel injection timing enables a higher substitution rate. In one embodiment, the current substitution may be increased exactly equal to the target substitution ratio. It should be noted herein that the term "approximately equal" is not limited to an exact value of the target substitution ratio and may also include proximate values depending on the application. In another embodiment, the current substitution may be increased to a maximum substitution ratio which is less than the target substitution ratio. In one embodiment, the pre-combustion temperature provides information to estimate a current allowable substitution ratio approximately to the target substitution ratio.

In accordance with the embodiments of the present invention, the utilization of the electric turbo-compounding system to extract energy from the system facilitates the base engine to operate at lower power output levels maintaining constant overall power output from the system. The work extraction from the electric turbo-compounding system can be used to control boost pressure which in turn controls the peak cylinder pressure which enables reduction in the brake mean effective pressure of the engine. Substitution ratio is enhanced by increasing the gas fueling and decreasing the diesel fueling and the engine is less susceptible to knock at the increased substitution ratio.

Further, the use of an electric turbo-compounding system to control the airflow in a dual fuel engine facilitates operation of the engine at a high substitution ratio. At low load operation, the electric turbo-compounding system is operated as a supercharger by operating the generator as a motor to generate the desired boost pressure and air-fuel ratio. Such control of the air-fuel ratio enables high substitution ratio for a dual fuel engine across all load and ambient conditions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   receiving a plurality of current operating parameters of an engine during operation of the engine;
   determining a current substitution ratio based on the plurality of current operating parameters;
   determining a target substitution ratio based on the plurality of current operating parameters;
   comparing the current substitution ratio with the target substitution ratio; and
   controlling a first power output from a plurality of cylinders of the engine and a second power output from an electric turbo-compounding system coupled to the engine, based on the comparison of the current substitution ratio with the target substitution ratio.

2. The method of claim 1, wherein the plurality of current operating parameters comprise an intake manifold temperature, an intake manifold pressure, an ambient pressure, an ambient temperature, an air-fuel ratio, a quantity of exhaust gas recirculation, a compression ratio, a fuel injection timing, an engine speed, an engine load, a concentration of oxygen in an exhaust gas, a generator current, and a generator voltage.

3. The method of claim 1, wherein the controlling further comprises operating a generator of the electric turbo-compounding system as a motor to increase a speed and a boost pressure of the electric turbo-compounding system.

4. The method of claim 1, further comprising:
   determining a current peak cylinder pressure based on the plurality of current operating parameters;
   determining a predefined peak cylinder pressure based on the plurality of current operating parameters;
   comparing the current peak cylinder pressure with the predefined peak cylinder pressure;
   controlling the first power output from the plurality of cylinders of the engine and the second power output from the electric turbo-compounding system coupled to the engine based on the comparison of the current peak cylinder pressure with the predefined peak cylinder pressure.

5. The method of claim 4, wherein the controlling comprises reducing the first power output from the plurality of cylinders to less than or equal to a first predefined power output and increasing the second power output from the electric turbo-compounding system to greater than or equal to a second predefined power output if the current substitution ratio is less than the target substitution ratio and the current peak cylinder pressure is greater than the predefined peak cylinder pressure.

6. The method of claim 5, wherein the reducing comprises controlling a plurality of fuel injectors so as to control an amount of a plurality of fuels injected to at least one of the plurality of cylinders and an intake manifold and the increasing comprises reducing a speed of the electric turbo-compounding system to a predefined speed by operating a generator of the electric turbo-compounding system to extract work and control a boost pressure from the electric turbo-compounding system.

7. The method of claim 5, further comprising increasing the current substitution ratio to approximately equal to the target substitution ratio if the current substitution ratio is less than the target substitution ratio and reducing the current peak cylinder pressure to approximately equal to the predefined peak cylinder pressure if the current peak cylinder pressure is greater than the predefined peak cylinder pressure.

8. The method of claim 5, further comprising operating the plurality of cylinders at a predefined brake mean effective pressure.

9. A computer readable medium, having instructions stored thereon which, when executed, causes a processor-based unit for an engine to perform a method, the method comprising:
receiving a plurality of current operating parameters of the engine during operation of the engine;
determining a current substitution ratio based on the plurality of current operating parameters;
determining a target substitution ratio based on the plurality of current operating parameters;
comparing the current substitution ratio with the target substitution ratio; and
controlling a first power output from a plurality of cylinders of the engine and a second power output from an electric turbo-compounding system coupled to the engine, based on the comparison of the current substitution ratio with the target substitution ratio.

10. The computer readable medium of claim 9, wherein the plurality of current operating parameters comprise an intake manifold temperature, an intake manifold pressure, an ambient pressure, an ambient temperature, an air-fuel ratio, a quantity of exhaust gas recirculation, a compression ratio, a fuel injection timing, an engine speed, an engine load, a concentration of oxygen in an exhaust gas, a generator current, and a generator voltage.

11. The computer readable medium of claim 9, wherein the controlling further comprises operating a generator of the electric turbo-compounding system as a motor to increase a speed and a boost pressure of the electric turbo-compounding system.

12. The computer readable medium of claim 9, wherein the method further comprises:
determining a current peak cylinder pressure based on the plurality of current operating parameters;
determining a predefined peak cylinder pressure based on the plurality of current operating parameters;
comparing the current peak cylinder pressure with the predefined peak cylinder pressure;
controlling the first power output from the plurality of cylinders of the engine and the second power output from the electric turbo-compounding system coupled to the engine based on the comparison of the current peak cylinder pressure with the predefined peak cylinder pressure.

13. The computer readable medium of claim 12, wherein the controlling comprises reducing the first power output from the plurality of cylinders to less than or equal to a first predefined power output and increasing the second power output from the electric turbo-compounding system to greater than or equal to a second predefined power output if the current substitution ratio is less than the target substitution ratio and the current peak cylinder pressure is greater than the predefined peak cylinder pressure.

14. The computer readable medium of claim 13, wherein the reducing comprises controlling a plurality of fuel injectors so as to control an amount of a plurality of fuels injected to at least one of an intake manifold and the plurality of cylinders and the increasing comprises reducing a speed of the electric turbo-compounding system to a predefined speed by operating a generator of the electric turbo-compounding system to extract work and control a boost pressure from the electric turbo-compounding system.

15. The computer readable medium of claim 13, wherein the method further comprises increasing the current substitution ratio to approximately equal to the target substitution ratio if the current substitution ratio is less than the target substitution ratio and reducing the current peak cylinder pressure to approximately equal to the predefined peak cylinder pressure if the current peak cylinder pressure is greater than the predefined peak cylinder pressure.

16. The computer readable medium of claim 13, wherein the method further comprises operating the plurality of cylinders at a predefined brake mean effective pressure.

17. A system comprising:
an engine comprising a plurality of cylinders and a plurality of fuel injectors coupled to the plurality of cylinders;
an electric turbo-compounding system coupled to the engine;
a controller coupled to the engine and the electric turbo-compounding system; wherein the controller is configured to:
receive a plurality of current operating parameters of the engine during operation of the engine;
determine a current substitution ratio based on the plurality of current operating parameters;
determine a target substitution ratio based on the plurality of current operating parameters;
compare the current substitution ratio with the target substitution ratio; and
control a first power output from a plurality of cylinders of the engine and a second power output from the electric turbo-compounding system coupled to the engine, based on the comparison the current substitution ratio with the target substitution ratio.

18. The system of claim 17, further comprising a plurality of sensors for measuring the plurality of current operating parameters comprising an intake manifold temperature, an intake manifold pressure, an ambient air pressure, an ambient temperature, an air-fuel ratio, a quantity of exhaust gas recirculation, a compression ratio, a fuel injection timing, an engine speed, an engine load, a concentration of oxygen in an exhaust gas, a generator voltage, and a generator current.

19. The system of claim 17, wherein the controller is further configured to operating a generator of the electric turbo-compounding system as a motor to increase a speed and a boost pressure of the electric turbo-compounding system.

20. The system of claim 17, wherein the controller is further configured to:
determine a current peak cylinder pressure based on the plurality of current operating parameters;
determine a predefined peak cylinder pressure based on the plurality of current operating parameters;

compare the current peak cylinder pressure with the predefined peak cylinder pressure;

control the first power output from the plurality of cylinders of the engine and the second power output from the electric turbo-compounding system coupled to the engine based on the comparison of the current peak cylinder pressure with the predefined peak cylinder pressure.

21. The system of claim 20, wherein the controller is further configured to reduce the first power output from the plurality of cylinders to less than or equal to a first predefined power output and increase the second power output from the electric turbo-compounding system to greater than or equal to a second predefined power output if the current substitution ratio is less than the target substitution ratio and the current peak cylinder pressure is greater than the predefined peak cylinder pressure.

22. The system of claim 21, wherein the controller is further configured to control a plurality of fuel injectors so as to control an amount of a plurality of fuels injected to at least one of an intake manifold and the plurality of cylinders, the controller is further configured to reduce a speed of the electric turbo-compounding system to a predefined speed by operating a generator of the electric turbo-compounding system to extract work and control a boost pressure from the electric turbo-compounding system.

23. The system of claim 21, wherein the controller is further configured to perform increasing the current substitution ratio to approximately equal to the target substitution ratio if the current substitution ratio is less than the target substitution ratio and reducing the current peak cylinder pressure to approximately equal to the predefined peak cylinder pressure if the current peak cylinder pressure is greater than the predefined peak cylinder pressure.

24. The system of claim 21, wherein the controller is further configured to operate the plurality of cylinders at a predefined brake mean effective pressure.

\* \* \* \* \*